UNITED STATES PATENT OFFICE 2,148,514

PREPARATION OF COMPOUNDS OF FLUORINE

Carl F. Swinehart, Cleveland, Ohio, assignor to The Harshaw Chemical Company, Elyria, Ohio, a corporation of Ohio No Drawing. Application July 11, 1936, Serial No. 90,254

6 Claims. (Cl. 23—88)

This invention relates to fluorine compounds, and it is among the objects of the invention to provide particularly efficient production with smooth control, convenient, manufacturing order, of highly advantageous products, with the elimination of the usual difficulties from high temperature operations and residues which customarily present serious problems in handling.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

By suitably reacting hydrofluoric acid upon a borate radical or borate of an alkali metal or ammonium or substituted ammonium, a product results which is reactable with a strong acid having a high boiling point, such as sulphuric or phosphoric acid, to the formation of further desired fluorine compound products. Thus, sodium tetraborate when reacted with hydrofluoric acid forms a compound $Na_2O(BF_3)_4$, as illustrated in the equation

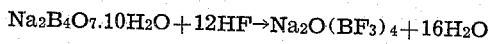

This compound, sodium oxide tetra boron trifluoride or more briefly, sodium fluoxyborax, slowly crystallizes from water and shows three axes of two-fold symmetry and three planes of two-fold symmetry apparently belonging to the rhombic system.

The method of preparation and yields together with analysis of the product for sodium and fluorine and the interpretation and related systems give further substantiation of the above new composition of the products which apparently should be represented by the following structural formula:

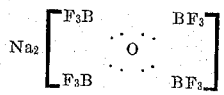

The ammonium compound corresponding, which is of next most important practical utility has the composition $(NH_4)_2O(BF_3)_4$, and may be conveniently prepared by reacting between $NH_4HF_2$ and $B(OH)_3$, thus

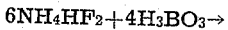
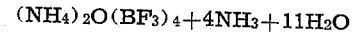

In this, ammonium bifluoride is mixed with the theoretical amount plus a slight excess of boric acid. The reaction mixture liquefies at room temperature and it is then boiled to dryness in iron equipment, driving off the ammonia and water. The completeness of this drying operation governs how close the final product corresponds to the theoretical composition. Of course, a solution of ammonium bifluoride could be used. However, this involves the evaporation of more water. Also, a combination of ammonium bifluoride, boric acid and hydrofluoric acid could be employed, but this also involves evaporation of more water, and if the amount of acid is not carefully adjusted, attack upon iron equipment will result.

In the preparation of the fluoxyboraxes, whether of sodium or other base, it is not in all cases necessary to evaporate the solution of borax and hydrofluoric acid sufficiently to remove all but one atom of oxygen, but the intermediate material can be used in further reactions, as described below, for obtaining boron fluoride. The more nearly the fluoxyborax proper, be attained, the less the sulphuric acid requirement in subsequent reactions. All of these reactions for the preparation of the compound $M_2O(BF_3)_4$ could be carried out in solution, except that practically this involves more evaporation cost.

By reacting such a fluoxyborax, as for instance sodium fluoxyborax with sulphuric acid, boron fluoride results in high yield, thus

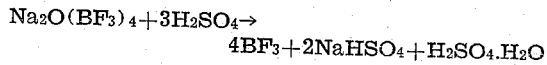

It is noticed that in this, the yield of boron fluoride is remarkably high and by-product water and sodium bisulphate very low, thus it is in notable contrast to the well known method of making boron fluoride by reacting calcium fluoride with sulphuric acid and borax, as

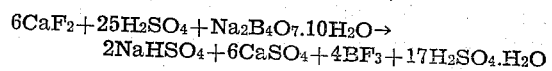

This "old" reaction furthermore is characterized by the requirement of a relatively high temperature, with furnace firing, and the formation of a retort residue which is extremely difficult to remove; and besides, the large amount of water liberated in the stage with the sulphuric acid occasions such a dilution as to be particularly destructive upon metal equipment. Furthermore, there is by the old method a serious waste in unreacted materials, the reaction stopping at around 30 per cent yield. With my improved procedure as above noted however, reaction proceeds at relatively low temperature, a steam jacket being sufficient for all heat requirement, and correspondingly allowing smooth and uniform control, with yields of 90 per cent or better, and the retort residues are liquid, and particularly easily handled, and the acid concentration-range and temperature is such as to avoid substantially all undesired action on metallic apparatus. As a matter of fact, it is desirable that an excess of sulphuric acid over indicated amounts be used, in order that (1) the water shall more completely remain in combination with the sulphuric acid, or otherwise it forms hydroxy fluoboric acid with the boron trifluoride which distills along with the product, and (2) an excess of $H_2SO_4$ prevents attack upon iron equipment, avoiding generation of excessive amounts of by-products from reaction with the iron. (3) Practically it is often desirable to use sulphuric acid containing a little water; thus an excess is necessary in order that that generated will not dilute the acid to the point of attacking the equipment. Accordingly the presence of a rather high concentration of sulphuric acid is desirable at the end of the reaction, as aside from the formation of salts the sulphuric acid acts as a dehydrating agent, displacing and releasing the $BF_3$ by fixing the water. This function is accomplished at lower temperatures as the ratio of $H_2SO_4$ to water is increased. There is an advantageous limit however. It will be seen that in the above old reaction then, more than 25 mols of sulphuric acid are actually required to prepare 4 mols of boron trifluoride whereas my new reaction requires only 3 mols of $H_2SO_4$. This emphasizes the advantage of the present new method of preparing $BF_3$ where (having reference to that portion of the acid which fixes the water) a fifty per cent increase in the amount of sulphuric acid required to fix the water and prevent attack upon the iron, would only add ½ mol $H_2SO_4$ more, whereas the same increase in acid applied in the old reaction would add 8½ mols, for an equivalent theoretical yield of $BF_3$.

As noted above, substituted ammonium compounds may be employed in the initial reaction with a borate radical, and thus, such a material as tetra methyl ammonium bifluoride could be used in such initial reaction, and although expensive, could be operated by recycling. In so far also as reaction by ammonium bifluoride is concerned, it may be noted that the sodium salt can also be made by reacting ammonium bifluoride and borax, with the production of ammonia and water, in similar manner as the ammonium salt described above.

As an example: 1 mol of sodium tetraborate is reacted upon with 12 mols of hydrofluoric acid, with the formation of $Na_2O(BF_3)_4$ which may be evaporated to dryness or crystallized out and marketed as such, if desired. 1 mol of $Na_2O(BF_3)_4$ reacted upon by 3 mols of sulphuric acid then yields boron fluoride, $BF_3$, which, as a gas passes from the retort through a cooling zone, and thence to a receiver.

As another example: 1 mol of $(NH_4)_2O(BF_3)_4$ is reacted upon by 3 mols of sulphuric acid, and boron fluoride is produced, which as a gas passes off and is cooled and may be compressed or otherwise stored.

It has been known for some time (J. J. Berzelius, cited in Mellor 5, 125) that when 8 mols of ammonium fluoride are heated with 1 mol of boric oxide, 2 mols of ammonium fluoborate are formed, with liberation of ammonia and water, according to the following reaction:

$$8NH_4F + B_2O_3 \rightarrow 2NH_4BF_4 + 6NH_3 + 3H_2O$$

I have found however, that if instead of such ratio designated by Berzelius, there be reacted 12 mols of ammonium fluoride with 2 mols of boric oxide, ammonia and water are evolved, and there is produced the novel compound $(NH_4)_2O(BF_3)_4$, this reaction being as follows:

$$12NH_4F + 2B_2O_3 \rightarrow (NH_4)_2O(BF_3)_4 + 10NH_3 + 5H_2O$$

I have found it more practical however, to prepare the same compound by reacting 6 mols of ammonium bifluoride and 4 mols of boric acid, because in such reaction much less ammonia is evolved and wasted, this reaction being as follows:

$$6NH_4HF_2 + 4H_3BO_3 \rightarrow (NH_4)_2O(BF_3)_4 + 4NH_3 + 11H_2O$$

It is thus seen that novel reactions, with novel products are available, and in a manner greatly facilitating the production of desired fluorine compounds.

Other modes of applying the principle of the invention may be employed, change being made as regards the details described, provided the features stated in any of the following claims, or the equivalent of such, be employed.

I therefore particularly point out and distinctly claim as my invention:

1. In the preparation of compounds of fluorine, reacting sodium tetraborate with hydrofluoric acid, eliminating water from the reaction product, and reacting the product with sulphuric acid, cooling the boron fluoride resultant, and compressing.

2. In the preparation of compounds of fluorine, reacting an alkali metal borate with hydrofluoric acid, eliminating water from the reaction product, and reacting the product with sulphuric acid, cooling the boron fluoride resultant, and compressing.

3. In the preparation of compounds of fluorine, reacting sodium tetraborate with hydrofluoric acid, eliminating water from the reaction product, and reacting the product with sulphuric acid.

4. In the preparation of compounds of fluorine, reacting an alkali metal borate with hydrofluoric acid, eliminating water from the reaction product, and reacting the product with sulphuric acid.

5. A new article of manufacture, comprising $Na_2O(BF_3)_4$.

6. As a new article of manufacture, a compound of the general formula $M_2O(BF_3)_4$ in which M is selected from the group comprised of the alkali metals and the $NH_4$ radical.

CARL F. SWINEHART.